No. 878,255. PATENTED FEB. 4, 1908.
C. I. THOMPSON.
MIRROR ATTACHMENT FOR CHAIRS.
APPLICATION FILED JULY 20, 1907.

Witnesses

Inventor
C. I. Thompson
By
Attorneys

UNITED STATES PATENT OFFICE.

CATHARINE I. THOMPSON, OF BENSONHURST, NEW YORK.

MIRROR ATTACHMENT FOR CHAIRS.

No. 878,255.  Specification of Letters Patent.  Patented Feb. 4, 1908.

Application filed July 20, 1907. Serial No. 384,716.

*To all whom it may concern:*

Be it known that I, CATHARINE I. THOMPSON, citizen of the United States, residing at Bensonhurst, in the county of Kings and State of New York, have invented certain new and useful Improvements in Mirror Attachments for Chairs, of which the following is a specification.

This invention has for its object an improved construction of mirror attachment for chairs of theaters and other public places, designed to form a simple, durable and efficient means whereby ladies may see how to properly replace their hats at the conclusion of the play or performance.

With this and other objects in view as will more fully appear as the description proceeds, the invention consists in certain constructions and arrangements of the parts that I shall hereinafter fully describe and claim.

Figure 1:
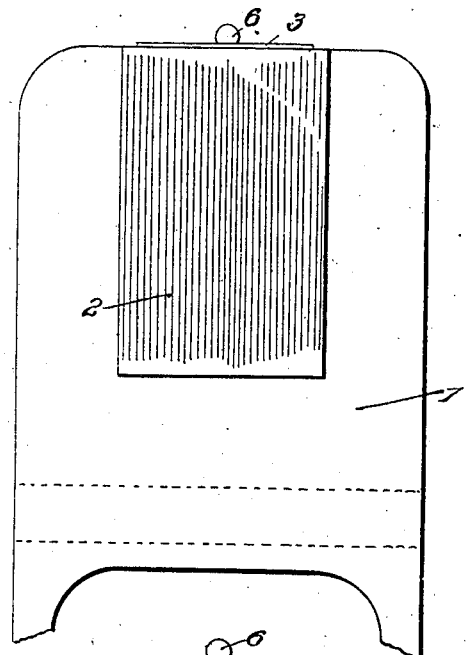
Figure 2:
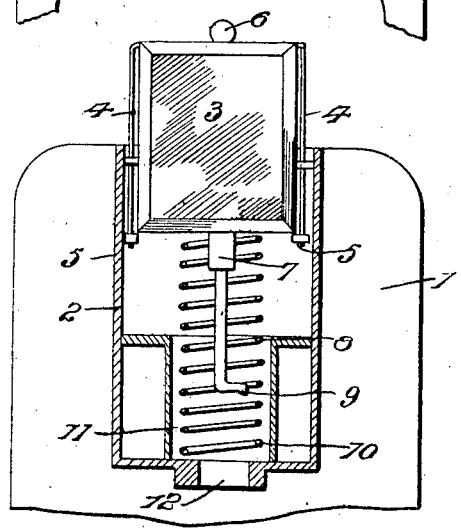
Figure 3:
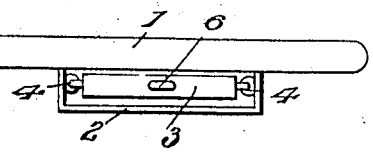

For a full understanding of the invention and the merits thereof and also to acquire a knowledge of the details of construction and the means for effecting the result, reference is to be had to the following description and accompanying drawings, in which:

Figure 1 is a rear view of my improved mirror attachment for chairs, the attachment being in retracted position; Fig. 2 is a similar view, part of the case being broken away and the mirror being shown partly extended; and, Fig. 3 is a top plan view with the case in section.

Corresponding and like parts are referred to in the following description and indicated in all the views of the drawings by the same reference characters.

Referring to the drawing, the numeral 1 designates the back of a theater or other chair and 2 a preferably metallic rectangular case which is secured to the rear side of the chair back in any desired way.

3 designates a mirror which may be framed in any desired manner and which is adapted to slide vertically within the upper end of the case 2, so as to be projected above the case or inclosed within the latter. Preferably the mirror 3 is provided at the sides of its frame with guide rods 4 that are formed at their lower ends with loops or projections 15 adapted to limit the upward or outward movement of the mirror from the case.

6 designates a knob which may be secured to the upper end of the mirror frame so as to serve as a convenient means for moving the mirror downwardly into the case.

A stem 7 is secured to and projects downwardly from the lower edge of the mirror frame. To this stem 7 a spring latch 8 is secured. The latch 8 is formed at its lower end with an angular portion 9 forming the latch or hook proper. A coil spring is designed to encircle the stem 7 and latch 8 and is mounted within a tube 11 in the lower end of the case 2, the said tube extending around an opening 12 in the bottom of the case, the opening being designed for the accommodation of the angularly disposed end 9 of the latch, so that such end may project through the opening and be caught at the bottom of the case in order to hold the mirror in retracted position. In order to move the mirror outwardly, it is only necessary to release the latch 8 from the case and the spring 10 will then force the mirror 3 upwardly from case.

From the foregoing description in connection with the accompanying drawings, it will be seen that I have provided a very simple, cheap and durable construction of mirror attachment for the backs of theater or other chairs which will be out of the way when not in use and which will enable any of the patrons of a theater or other public hall to see to arrange their hair or replace their hat properly at the conclusion of the play.

Having thus described the invention, what is claimed as new is:

The herein-described mirror attachment for chairs, consisting of a case provided at its bottom with an opening, a tube within the bottom of the case and surrounding said opening, a coil spring mounted in said tube, a mirror adapted to fit in the upper end of said case, a stem projecting from the bottom of the mirror, and a spring latch depending from and secured to the stem and adapted to extend through the tube and bottom of the case, the said latch being provided with an angularly disposed end for engagement with the bottom of the case, and a spring encircling said latch and the stem and adapted to move the mirror upwardly from the case.

In testimony whereof I affix my signature in presence of two witnesses.

CATHARINE I. THOMPSON. [L. S.]

Witnesses:
GRAHAM K. ANDERSON,
IVAN T. JOHNSON.